US005616672A

United States Patent [19]
O'Brien et al.

[11] Patent Number: 5,616,672
[45] Date of Patent: Apr. 1, 1997

[54] PAPER RELEASE COMPOSITIONS HAVING IMPROVED RELEASE CHARACTERISTICS

[75] Inventors: Michael J. O'Brien, Clifton Park; Roy M. Griswold, Ballston Spa, both of N.Y.

[73] Assignee: General Electric Company, Waterford, N.Y.

[21] Appl. No.: 560,144

[22] Filed: Nov. 17, 1995

[51] Int. Cl.$^6$ .................................................. C08G 77/08
[52] U.S. Cl. ............................. 528/15; 528/32; 525/478; 525/479
[58] Field of Search ...................... 528/32, 15; 525/478, 525/479

[56] References Cited

U.S. PATENT DOCUMENTS

| | | |
|---|---|---|
| 3,344,111 | 9/1967 | Chalk . |
| 3,418,731 | 12/1968 | Anciaux . |
| 3,445,420 | 5/1969 | Kookootsdes et al. . |
| 3,461,185 | 8/1969 | Brown . |
| 3,882,083 | 5/1975 | Berger et al. . |
| 3,989,667 | 11/1976 | Lee et al. . |
| 4,043,977 | 8/1977 | deMontigny et al. . |
| 4,057,596 | 11/1977 | Takamizawa et al. . |
| 4,061,609 | 12/1977 | Bobear . |
| 4,256,870 | 3/1981 | Eckberg . |
| 4,337,332 | 6/1982 | Melancon et al. . |
| 4,347,346 | 8/1982 | Eckberg . |
| 4,386,135 | 5/1983 | Campbell et al. . |
| 4,448,815 | 5/1984 | Grenoble et al. . |
| 4,465,818 | 8/1984 | Shirahata et al. . |
| 4,472,563 | 9/1984 | Chandra et al. . |
| 4,476,166 | 10/1984 | Eckberg . |
| 4,533,575 | 8/1985 | Melancon . |
| 4,562,096 | 12/1985 | Lo et al. . |
| 4,772,515 | 9/1988 | Hara et al. . |
| 4,783,552 | 11/1988 | Lo et al. . |
| 5,036,117 | 7/1991 | Chung et al. . |

*Primary Examiner*—Melvyn I. Marquis
*Attorney, Agent, or Firm*—Kenneth S. Wheelock

[57] ABSTRACT

Substantially branched alkenyl silicone polymer compositions having on average at least two branching points per molecule provide paper release compositions wherein the delamination force is reduced at all delamination speeds.

19 Claims, No Drawings

PAPER RELEASE COMPOSITIONS HAVING IMPROVED RELEASE CHARACTERISTICS

FIELD OF THE INVENTION

The present invention relates to curable alkenyl based silicone release coating compositions for paper release applications. The present invention provides for a reduction in the delamination force, particularly as delamination speed increases.

BACKGROUND OF THE INVENTION

Curable silicone compositions are applied to paper substrates to aid in the release of adhesive materials thereon. Laminates comprising a release paper coated with a pressure sensitive adhesive and a sheet material that can be a decorative lamina or label are used by stripping off the release liner which is discarded and affixing the lamina or label onto a surface.

Typically these release compositions cure by one of two mechanisms, thermal curing or photo-catalytic curing. Thermally curing paper release systems generally are comprised of the following compositions:

(A) a linear alkenyl substituted polysiloxane polymer that is the primary component or base polymer of the curable composition;

(B) an hydrosilylation addition cure catalysts, typically either a platinum or rhodium based catalyst;

(C) a cure inhibiting compound or mixtures thereof to increase the useful life of the coating bath; and (D) a hydride functional cross-linking silicone, typically a methyl hydrogen siloxane polymer, copolymer or oligomer.

While the general practice usually employs linear base polymers, (A), solventless, high solids content formulations have been described. As described in U.S. Pat. No. 4,448,815 ('815) a linear alkenyl siloxane base copolymer is a copolymer of:

(1)

$$R_c R_d^1 Si_{(4-c-d)/2} \qquad 1)$$

where R is generally an alkyl radical, $R^1$ is a low molecular weight olefinic substituent such as vinyl or allyl, c has value from 0 to 2 and the average of value of the sum c+d is 0.8 to 3; and (2)

$$R_n SiO_{(4-n)/2} \qquad 2)$$

where R is generally an alkyl radical and n has a value of 0.8 to 2.5. The preferred base copolymer of the '815 patent has the following linear structure:

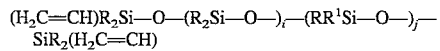

where the subscripts i and j are integers.

U.S. Pat. No. 4,774,111 ('111) describes a variation of the above linear copolymer where the R group in formula 2 is selected from alkyl and alkenyl radicals. The polymer of the '111 patent is defined as being substantially linear, i.e. having no more than a trace amount of T or Q groups. This substantially linear requirement for alkenyl functional heat curing silicone release compositions is repeated in U.S. Pat. Nos. 4,772,515; 4,783,552 and 5,036,117.

In contrast, the possibility of branched alkenyl polymers is admitted by the structural formulas recited in U.S. Pat. No. 4,057,596 ('596). In the '596 patent the composition comprises:

(A') a substantially linear vinyl chainstopped polymer;
(B') a linear methyl hydrogen polymer;
(C') a methyl vinyl polysiloxane having at least three vinyl groups per molecule;
(D') a methyl hydrogen polysiloxane having at least three hydride hydrogen atoms per molecule; and
(E') a platinum hydrosilylation catalyst. Component (C') is described in the '596 patent as containing $(H_2C=CH)(CH_3)SiO_{2/2}$ ($D^{vi}$), $(H_2C=CH)(CH_3)_2SiO_{1/2}$ ($M_{vi}$), and $(H_2C=CH)SiO_{3/2}$ ($T^{vi}$), units either singly or in combination with $(CH_3)_2SiO_{2/2}$ (D), $(CH_3)_3SiO_{1/2}$ (M), and $(CH_3)SiO_{3/2}$ (T). The optional inclusion of vinyl substituted T units and methyl T units permits the composition of the '596 patent to possess branched structures.

U.S. Pat. No. 4,386,135 describes a terminally unsaturated silicone polymer having the formula $$R_{4-a}Si((R_2SiO\!-\!)_b OSiR_2 R^2)_a \qquad 3)$$

where a may be 2, 3, or 4. When a=4 the formula produces a Q resin. When a=3, a T structure results and the structure possesses only a single branch point. When a=2, the formula devolves to an alkenyl chain stopped linear polymer.

The alkenyl functional silicone polymer paper release compositions typically used fall into one of two categories: 1) a linear alkenyl chainstopped polymer:

where $M^{vi}$ indicates an alkenyl chainstopping M group or 2) multi-functional alkenyl copolymers:

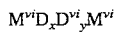

where $D^{vi}$ indicates an alkenyl substituted D group. The alkenyl chain stopped polymers, $M^{vi}D_xM^{vi}$, generally cure faster than the multi-functional copolymers, $M^{vi}D_xD^{vi}_yM^{vi}$. As paper release composites are delaminated, the formulations based on the linear alkenyl chainstopped polymers show significant increases in the delamination force necessary as delamination speed increases. In contrast, while the multi-functional alkenyl polymers tend to have a slower curing speed the increase in delamination force with increasing delamination speed is not nearly as great proportionately.

Accordingly, it is desirable to provide a composition having the high cure speed of the alkenyl chainstopped polymers with the lower release force characteristics of the multi-functional alkenyl compositions. It would also be desirable to have the release force change as little as possible as a function of increasing delamination speed.

SUMMARY OF THE INVENTION

Thus the present invention provides for a substantially branched curable alkenyl silicone having the formula:

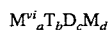

where $M^{vi}=R_{3-p}R^1_p SiO_{1/2}$, where R is selected from the group consisting of one to forty carbon monovalent hydrocarbon radicals and $R^1$ is selected from the group consisting of two to forty carbon atom terminal olefinic monovalent hydrocarbon radicals, where p varies from 1 to 3;

T=$R^2SiO_{3/2}$ where $R^2$ is selected from the group consisting of R and $R^1$;

D=$R^3R^4SiO_{2/2}$ where $R^3$ and $R^4$ are each independently selected from the group consisting of R and $R^1$; and M=$R_3SiO_{1/2}$ where each R is as previously defined and is independently selected; wherein a and b have values ranging from about 2 to about 5, c is an integer ranging from about 50 to about 1,000 and d has a value ranging from 0 to 0.5, preferably from 0.25 to about 0.5, more preferably from about 0.35 to about 0.5 and most preferably from about 0.4 to about 0.5; which composition is preferably crosslinked by a substantially linear hydrogen siloxane selected from the group of compounds:

$MD_eD'_fM$, $MD'_fM$, $MD_eD'_fM'$, $M'D_eD'_fM'$, and $M'D_eM'$ where
M=$R'_3SiO_{1/2}$,
M'=$H_gR'_{3-g}SiO_{1/2}$, and
D=$R'R'SiO_{2/2}$, and
D'=$R'HSiO_{2/2}$ wherein each R' in M, M', D, and D' is independently selected from the group consisting of one to forty carbon monovalent hydrocarbon radicals wherein the subscripts e and f may be zero or positive whereby the sum of e and f ranges from about 10 to about 100 subject to the limitation that the sum of f and g is two or greater. The substantially linear hydrogen siloxane is preferably selected from the group consisting of $MD_eD'_fM$, $MD'_fM$, and mixtures thereof.

Preferably the substituents, R, of the substantially branched curable alkenyl silicone are methyl, trifluoropropyl or phenyl and $R^1$ is preferably selected from the group consisting of two to ten carbon atom alkenyl groups. Further, in the substantially linear hydrogen siloxane R' is preferably methyl, trifluoropropyl or phenyl.

The compositions of the present invention may be utilized as a solventless composition, a composition diluted by a suitable solvent, or as an aqueous emulsion and find particular use in paper release compositions.

DETAILED DESCRIPTION OF THE INVENTION

The present invention improves upon the art by providing a substantially branched alkenyl curable silicone composition of the formula $$M^{vi}_aT_bD_cM_d \qquad 6)$$

where $M^{vi}=R_{3-p}R^1_pSiO_{1/2}$, where R is selected from the group consisting of one to forty carbon monovalent hydrocarbon radicals and trifluoropropyl and $R^1$ is selected from the group consisting of two to forty carbon atom olefinic monovalent hydrocarbon radicals, where p ranges from 1 to 3; T=$R^2SiO_{3/2}$ where $R^2$ is selected from the group consisting of R and $R^1$, D=$R^3R^4SiO_{2/2}$ where $R^3$ and $R^4$ are each independently selected from the group consisting of R and $R^1$, and M=$R_3SiO_{1/2}$ where each R is independently selected and the subscripts a and b have values ranging from about 2 to about 5 and c is an integer ranging from about 50 to about 1,000 and d has a value ranging from 0 to 0.5, preferably from 0.25 to about 0.5, more preferably from about 0.35 to about 0.5 and most preferably from about 0.4 to about 0.5. Applicants define the term substantially branched to mean that the average number of T branching sites per alkenyl silicone molecule of (A) is at least two and preferably three.

The paper release compositions of the present invention comprise:

(A) a substantially branched alkenyl silicone having the formula:

$$M^{vi}_aT_bD_cM_d \qquad 6)$$

where the subscripts a, b, c, and d are as previously defined;

(B) a substantially linear hydrogen siloxane selected from the group of compounds:

| | |
|---|---|
| $MD_eD'_fM$ | 7a) |
| $MD'_fM$, | 7b) |
| $MD_eD'_fM'$ | 7c) |
| $M'D_eD'_fM'$, and | 7d) |
| $M'D_eM'$ | 7e) | where M is as previously defined and
M'=$H_gR_{3-g}SiO_{1/2}$
D=$RRSiO_{2/2}$ where each R is independently selected and
D'=$RHSiO_{2/2}$
where R is as previously defined, the subscripts e and f may be zero or positive wherein the sum of e and f ranges from about 10 to about 100 subject to the limitation that the sum of f and g is two or greater.

(C) a hydrosilylation catalyst comprising a metal selected from the group consisting of nickel, palladium, platinum, rhodium, iridium, ruthenium and osmium; and (D) a cure inhibitor.

The amounts of Components (A) and (B) that are used in the compositions of this invention are not narrowly limited. Said amounts, expressed in terms of the ratio of the number of silicon-bonded hydrogen atoms of Component (B) to the number of silicon-bonded olefinic hydrocarbon radicals of Component (A), as is typically done, are sufficient to provide a value for said ratio of from 1/100 to 100/1, usually from 1/20 to 20/1, and preferably from 1/2 to 20/1.

Broadly stated, Component (C) of the composition of this invention is a catalyst component which facilitates the reaction of the silicon-bonded hydrogen atoms of Component (B) with the silicon-bonded olefinic hydrocarbon radicals of Component (A) and can be any platinum-containing catalyst component. For example, Component (C) can be platinum metal; a carrier such as silica gel or powdered charcoal, bearing platinum metal; or a compound or complex of a platinum metal.

A typical platinum-containing catalyst component in the organopolysiloxane compositions of this invention is any form of chloroplatinic acid, such as, for example, the readily available hexahydrate form or the anhydrous form, because of its easy dispersibility in organosiloxane systems. A particularly useful form of chloroplatinic acid is that composition obtained when it is reacted with an aliphatically unsaturated organosilicon compound such as divinyltetramethyldisiloxane, as disclosed by U.S. Pat. No. 3,419,593 incorporated herein by reference.

The amount of platinum-containing catalyst component that is used in the compositions of this invention is not narrowly limited as long as there is a sufficient amount to accelerate a room temperature reaction between the silicon-bonded hydrogen atoms of Component (B) with the silicon-bonded olefinic hydrocarbon radicals of Component (A). The exact necessary amount of said catalyst component will depend upon the particular catalyst and is not easily predictable. However, for chloroplatinic acid said amount can be as low as one part by weight of platinum for every one million parts by weight of organosilicon Components (A) plus (B). Preferably said amount is at least 10 parts by weight, on the same basis.

For compositions of this invention which are to be used in the coating method of this invention the amount of platinum-containing catalyst component to be used is preferably sufficient to provide from 10 to 500 parts by weight platinum per one million parts by weight of organopolysiloxane Components (A) plus (B).

The hydrosilylation catalyst is selected from the group consisting of catalyst comprising a metal selected from the group consisting of nickel, palladium, platinum, rhodium, iridium, ruthenium and osmium or as taught in U.S. Pat. Nos. 3,159,601; 3,159,662; 3,419,593; 3,715,334; 3,775,452 and 3,814,730.

Inhibitors, component (D), for the platinum group metal catalysts are well known in the organosilicon art. Examples of various classes of such metal catalyst inhibitors include unsaturated organic compounds such as ethylenically or aromatically unsaturated amides, U.S. Pat. No. 4,337,332; acetylenic compounds, U.S. Pat. Nos. 3,445,420 and 4,347, 346; ethylenically unsaturated isocyanates, U.S. Pat. No. 3,882,083; olefinic siloxanes, U.S. Pat. No. 3,989,667; unsaturated hydrocarbon diesters, U.S. Pat. No. 4,256,870; 4,476,166 and 4,562,096, and conjugated ene-ynes. U.S. Pat. Nos. 4,465,818 and 4,472,563; other organic compounds such as hydroperoxides, U.S. Pat. No. 4,061,609; ketones, U.S. Pat. No. 3,418,731; sulfoxides, amines, phosphines, phosphites, nitriles, U.S. Pat. No. 3,344,111; diaziridines, U.S. Pat. No. 4,043,977; half esters and half amides, U.S. Pat. No. 4,533,575; and various salts, such as U.S. Pat. No. 3,461,185. It is believed that the compositions of this invention can comprise an inhibitor from any of these classes of inhibitors.

The inhibitors may be selected from the group consisting of ethylenically unsaturated amides, aromatically unsaturated amides, acetylenic compounds, ethylenically unsaturated isocyanates, olefinic siloxanes, unsaturated hydrocarbon diesters unsaturated hydrocarbon monoesters of unsaturated acids, conjugated ene-ynes, hydroperoxides, ketones, sulfoxides, amines, phosphines, phosphites, nitriles, and diaziridines.

Preferred inhibitors for the compositions of this invention are the maleates and alkynyl alcohols.

The amount of Component (D) to be used in the compositions of this invention is not critical and can be any amount that will retard the above-described platinum-catalyzed hydrosilylation reaction at room temperature while not preventing said reaction at moderately elevated temperature, i.e. a temperature that is 25 to 50° C above room temperature. No specific amount of inhibitor can be suggested to obtain a specified bath life at room temperature since the desired amount of any particular inhibitor to be used will depend upon the concentration and type of the platinum group metal-containing catalyst, the nature and amounts of Components (A) and (B). The range of Component (D) can be 0.1–10% by weight, preferably 0.15–2% by weight, and most preferably 0.2–1% by weight.

The compositions of the present invention may be used either as formulations that are free of solvent, i.e. 100% solids, diluted with an organic solvent that is miscible, or as an aqueous emulsion. When the formulation of the present invention is used as a solventless coating, it is preferred that the viscosity of the branched alkenyl silicone in a range varying from about 100 to about 10,000 centipoise, preferably from about 125 to about 1,000, more preferably from about 150 to about 500, and most preferably from about 200 to about 300 centipoise. This is most easily accomplished by manipulation of the ratios of the stoichiometric subscripts between the terminal M and $M^{vi}$ groups and the T groups in the formula:

$$M^{vi}_a T_b D_c M_d \qquad 6)$$

with one general consideration being that $a+d \geq b$. If this condition is not met, the branched alkenyl silicone becomes much more viscous. This does not defeat the applicability of the silicone as a release coating material because the silicone may be dispersed or dissolved in a suitable solvent and coated thereby.

It is generally appreciated that other components may be added to the compositions of the present invention such as bath life extenders of U.S. Pat. No. 5,036,117 and co-pending application Ser. No. 08/295,125, filed Aug. 24, 1994, Pat. No. 5,516,558 release additives for increasing the release force; fillers, extenders, reactive diluents, anchorage additives that improve adhesion to specific substrates, and the like.

When used as emulsions, the silicones of the present invention are generally emulsified by the addition of non-ionic surfactants, addition of water followed by processing in a colloid mill.

All United States patents referenced herein are herewith and hereby specifically incorporated by reference.

EXPERIMENTAL

The following examples are designed to illustrate the present invention and are not to be construed as limiting the invention as embodied in these specific examples.

EXAMPLE 1

Preparation of Polymer A 436.2 g of a low viscosity polymer with an M:T:D ratio of approximately 3:22:82 respectively (where the organo groups on M, D, and T are all methyl) having a silanol content of 0.5 weight percent was mixed with 400.0 g of a vinyl chainstopped fluid having the approximate formula $M^{vi}D_8M^{vi}$ along with 1,273.7 g of octamethylcyclotetrasiloxane. The mixture was equilibrated at 155 to 160° C. using 5.8 g potassium silanolate (equivalent to 5.2 weight percent KOH) as an equilibration catalyst. Water was generated during the early part of the reaction and this was swept out of the reaction vessel using a nitrogen sweep and a Dean Stark trap. After the reaction was complete, the base was neutralized with silyl phosphate and then cooled to room temperature. The resulting product was then stripped on a Pope Wiped Film Evaporator at 195° C. and 0.2 mm Hg pressure yielding 1,823.3 g of Polymer A as a 370 centipoise fluid having a vinyl content of approximately 1.2 weight percent.

EXAMPLE 2

Preparation of Polymer B 571.2 g of the low viscosity MTD fluid used in the preparation of Polymer A was reacted with 1,250.6 g of a vinyl chainstopped fluid having the approximate formula $M^{vi}D_{25}M^{vi}$ along with 1,666.7g of octamethylcyclotetrasiloxane and 4.9 g of potassium silanolate as described in the preparation of Polymer A. After neutralization and stripping, Polymer B was obtained as a 374 centipoise fluid with 1.0 weight percent vinyl.

EXAMPLE 3

Preparation of Polymer C 180.0 g of the low viscosity MTD fluid used in the preparation of Polymer A was reacted with 472.8 g of a vinyl chainstopped fluid having the approximate formula $M^{vi}D_{25}M^{vi}$ along with 658.2 g of octamethylcyclotetrasiloxane and 9.0 g of divinyltetramethyldisiloxane and 0.9 g of potassium silanolate as described in the preparation of Polymer A. After neutralization and stripping (two passes on the Pope still), Polymer C was obtained as a 189 centipoise fluid with 1.1 weight percent vinyl.

EXAMPLES 4–6

Solventless Coater Trials

The following three formulations were prepared for coating trials:

EXAMPLE 4

Vinyl Chainstopped Polymer Control 800 g of a 225 centistoke vinyl chainstopped polymer was mixed with 0.73 g of a platinum divinyl tetramethyl disiloxane complex (11% Pt), then further mixed with 3.2 g of diallyl maleate (inhibitor) followed by 40.0 g of a trimethylsilyl stopped methyl hydrogen dimethylpolysiloxane crosslinker having a hydride content of 1.05 weight percent as SiH.

EXAMPLE 5

Multi-Functional Polymer Control 800 g of a 275 centistoke multi-functional vinyl polymer (1.4 weight percent vinyl) was mixed with 0.73 g of platinum divinyl tetramethyl disiloxane complex (11% Pt) then further mixed with 4.0 of diallyl maleate followed by 60.0 of trimethylsilyl stopped methyl hydrogen dimethylpolysiloxane crosslinker having a hydride content of 1.05 weight percent as SiH.

EXAMPLE 6

Polymer A Formulation 800 g of Polymer as prepared was mixed with 0.73 g of a platinum divinyltetramethyldisiloxane complex (11% Pt) then further mixed with 4.0 g of diallyl maleate followed by 48.0 g of trimethylsilyl stopped methyl hydrogen dimethylpolysiloxane crosslinker having a hydride content of 1.05 weight percent as SiH.

Formulations from Example 4–6 were coated via differential offset gravure at approximately 0.7 lbs./ream coatweight on Kammerer AV100® glassine using a Dixon Pilot Coater. Cure was accomplished at 100 fpm with the curing oven set at 350° F. Laminates were then prepared using Flexcryl 1625®, manufactured by Air Products and Chemicals, Inc., emulsion acrylic adhesive and a 50 lb./ream smudge proof facestock. Release in g/2 in was then measured at a variety of delamination speeds after aging for one day. The results are presented in Table 1.

TABLE 1

| | Release Force Data (g/2 in.) at Various Delamination Speeds One Day Aging | | | | |
|---|---|---|---|---|---|
| Example | 0.04 m/s | 0.05 m/s | 1.0 m/s | 2.5 m/s | 5.0 m/s |
| 4 | 33.3 | 72.6 | 99 | 116.8 | 127.8 |
| 5 | 55 | 66.8 | 74.9 | 103 | 91.1 |
| 6 | 31.6 | 51.1 | 59.4 | 72.2 | 76.6 |

This data demonstrates that Polymer A gave low release across all of the delamination speeds. In contrast, the vinyl chainstopped fluid, example 4, provided low release at 0.04 m/s but increases significantly as delamination speed increased. A similar effect was observed with the multi-functional polymer that the increase was not proportionately as large and it started from a higher release value at the lowest delamination speed. The composition of the invention of provides the lowest release forces as a function of the delamination speed of the three formulations compared.

Table 2 shows the results obtained after one week aging.

TABLE 2

| | Release Force Data (g/2 in.) at Various Delamination Speeds One Week Aging | | | | |
|---|---|---|---|---|---|
| Example | 0.04 m/s | 0.05 m/s | 1.0 m/s | 2.5 m/s | 5.0 m/s |
| 4 | 26.8 | 61.8 | 73.4 | 104.3 | 118.6 |
| 5 | 47.8 | 74.2 | 85.6 | 97.1 | 96.7 |
| 6 | 26.9 | 49.1 | 63.2 | 71.3 | 78.8 |

EXAMPLES 7–10

Further Solventless Coater Trials

The following formulations were prepared for coating trials:

EXAMPLE 7

Vinyl Chainstopped Polymer Control 800 g of a 225 centistoke vinyl chainstopped polymer was mixed with 0.77 g platinum divinyl tetramethyl disiloxane complex (11% Pt) then further mixed with 4.0 g diallyl maleate, followed by 40.0 g of a trimethylsilyl stopped methyl hydrogen dimethylpolysiloxane crosslinker having a hydride content of 1.05 weight percent as SiH.

EXAMPLE 8

Multi-Functional Polymer Control 800 g of 275 centistoke multi-functional vinyl polymer (1.4 weight percent vinyl) was mixed with 0.77 g of platinum divinyl tetramethyl disiloxane complex (11% Pt) then further mixed with 4.0 g diallyl maleate followed by 60.0 g of a trimethylsilyl stopped methyl hydrogen dimethylpolysiloxane crosslinker having a hydride content of 1.05 weight percent.

EXAMPLE 9

Polymer B Formulation 800 g of Polymer B was mixed with 0.77 g of platinum divinyl tetramethyl disiloxane complex (11% Pt) then further mixed with 4.0 g diallyl maleate followed by 48.0 g of a trimethylsilyl stopped methyl hydrogen dimethylpolysiloxane crosslinker having a hydride content of 1.05 weight percent.

EXAMPLE 10

Polymer C Formulation 800 g of Polymer C as prepared was mixed with 0.77 g of platinum divinyl tetramethyl disiloxane complex (11% Pt) then further mixed with 4.0 g diallyl maleate followed by 48.0 g of a trimethylsilyl stopped methyl hydrogen dimethylpolysiloxane crosslinker having a hydride content of 1.05 weight percent.

Formulations 7–10 were coated, cured, and laminated as previously described. The release versus delamination speeds at one day aging are summarized in Table 3.

TABLE 3

| | Release Force Data (g/2 in.) at Various Delamination Speeds One Day Aging | | | | |
|---|---|---|---|---|---|
| Example | 0.04 m/s | 0.05 m/s | 1.0 m/s | 2.5 m/s | 5.0 m/s |
| 7 | 20.5 | 70.1 | 94.3 | 120.1 | 132.8 |
| 8 | 33.8 | 69.9 | 83.7 | 95 | 100.1 |
| 9 | 19.5 | 40.8 | 52.5 | 68.4 | 81.4 |
| 10 | 23.9 | 58.2 | 69.3 | 91.1 | 97.7 |

Again the release formulations prepared with the branched resins of the present invention provided the lowest release force at any given delamination speed.

EXAMPLES 11–13

Preparation of Emulsions

EXAMPLE 11

Polymer A Emulsion 589.4 g of Polymer A was mixed with 43 g of trimethylsilyl stopped methyl hydrogen dimethylpolysiloxane having a hydride content of 1.05 weight percent, 30 g of low viscosity di-silanol stopped fluid and 1.5 g of 3, 5-dimethyl-1-hexyn-3-ol. To this was added a mixture of 187 g of de-ionized water, 375 g of a 10 weight percent solution of polyvinyl; alcohol (PVA, 88% hydrolyzed), 0.9 Triton X-100®, manufactured by Union Carbide Corporation, and 1.8 g Igepal CA-520®, manufactured by GAF Corporation. The mixture was thoroughly mixed for a period of one hour and then passed through a colloid mill into a mixture of 221 g de-ionized water, 33.7 propylene glycol and 3.4 g formalin. The resulting product was again mixed for a period of one hour and then homogenized at 8,000 psi (three passes) to yield a 3,140 centipoise emulsion with mean particle size of 0.49 microns and a span of 1.63.

EXAMPLE 12

Multi-Functional Polymer Emulsion

Using 589.4 of the same multi-functional polymer as was used in examples 5 and 8 along with 55.5 g of hydride crosslinker as previously described and the other reagents in exactly the same quantities, the emulsification procedure of example 11 was used to produce a 3450 centipoise emulsion with a particle size of mean 0.49 micron and a span of 1.77.

EXAMPLE 13

Vinyl Chain Stopped Emulsion 617.6 g of 375 centistoke vinyl chain stopped fluid was mixed with 32.3 of a trimethylsilyl stopped methyl hydrogen dimethylpolysiloxane crosslinker having a hydride content of 1.05 weight percent, 29.9 g of a low viscosity silanol stopped fluid, and 1.5 g of 3, 5-dimethyl-1-hexyn-3-ol. To this was added a mixture of 182.6 g de-ionized water, 373.2 of a 10% polyvinyl alcohol solution as previously described. The resulting mixture was thoroughly mixed for a period of one hour and then passed through a colloid mill into a mixture of 219.8 g de-ionized water, 33.6 propylene glycol and 3.4 g formalin. The resulting mixture was mixed thoroughly for a period of one hour and then homogenized at 8,000 psi (three passes) to yield a 2,300 centipoise emulsion with a mean particle size of 0.50 microns and a span of 1.70.

34.3 parts of each of the three emulsions were added to 62.5 parts deionized water followed by 1.2 parts of a commercial platinum catalyst emulsion (SM3010® available from GE Silicones). The resulting baths were coated on Karometer AV100® glassine using a #4 Meyer bar and then cured at 300° F. for 30 seconds in a Blue M oven. The release liners were then laminated with Flexcryl 1625® and facestock as previously described and release force versus delamination speed at one day aging was determined (Table4).

TABLE 4

| | Release Force Data (g/2 in.) at Various Delamination Speeds One Day Aging | | | |
|---|---|---|---|---|
| Example | 0.04 m/s | 1.0 m/s | 2.5 m/s | 5.0 m/s |
| 11 | 55.1 | 79.7 | 96.0 | 103.3 |
| 12 | 49.7 | 74.8 | 92.8 | 92.1 |
| 13 | 44.4 | 148.9 | 158.6 | 176.6 |

Table 4 demonstrates that the polymer of the invention, Polymer A, provides lower release force in almost every instance.

EXAMPLE 14

Preparation of Polymer D 196.8 g of low viscosity MTD fluid as previously described was reacted at 155–160° C. with 449.2 g of a vinyl chainstopped fluid having the formula $M^{vi}D_{25}M^{vi}$, 660.1 g of octamethylcyclotetrasiloxane, and 0.75 g potassium silanolate as described previously. After neutralization, stripping on the Pope still (195° C., 0.35 mm Hg, 2 passes), and filtration with 0.2% Celite®, 1,045 g of Polymer D was obtained as a 224 centipoise fluid having a vinyl content of 1.05 weight percent vinyl.

EXAMPLE 15

Preparation of Polymer E 262.8 g of the low viscosity MTD fluid previously described was reacted at 155–158° C. with 568.2 g of a vinyl chainstopped fluid having he formula $M^{vi}D_{25}M^{vi}$, 485.0 g of octamethylcyclotetrasiloxane, and 0.75 g of potassium silanolate. After neutralization and stripping on the Pope still (196° C., 0.35 mm Hg, 2 passes ), and filtration with 0.2% Celite®, 1,063.3 g of Polymer E was obtained as a 194 centipoise fluid having a vinyl content of 1.26 weight percent vinyl.

EXAMPLES 16–19

Solventless Cure Evaluation

EXAMPLE 16

Vinyl Chainstopped Formulation 10.0 g of a 225 centipoise vinyl chainstopped fluid was mixed with 0.04 g diallyl maleate, 0.15 g of a mixture of a platinum divinyl tetramethyl disiloxane complex in a vinyl chainstopped fluid having the formula $M^{vi}D_{25}M^{vi}$, (1% Pt), and 0.50 g of methyl hydrogen stopped dimethylpolysiloxane crosslinker.

EXAMPLE 17

Multi-Functional Formulation 10.0 g of the same multi-functional polymer as in examples 5,8, and 12 was mixed with 0.04 g diallyl maleate, 0.15 g of a mixture of a platinum divinyl tetramethyl disiloxane complex in a vinyl chainstopped fluid having the formula $M^{vi}D_{25}M^{vi}$, (1% Pt), and 0.75 g of methyl hydrogen stopped dimethylpolysiloxane crosslinker.

EXAMPLE 18

Branched Polymer D Formulation 10.0 g of Polymer D was mixed with 0.04 g diallyl maleate, 0.15 g of a mixture of a platinum divinyl tetramethyl disiloxane complex in a vinyl chainstopped fluid having the formula $M^{vi}D_{25}M^{vi}$, (1% Pt), and 0.60 g of methyl hydrogen stopped dimethylpolysiloxane crosslinker.

EXAMPLE 19

Branched Polymer E Formulation 10.0 g of Polymer E was mixed with 0.04 g diallyl maleate, 0.15 g of a mixture of a platinum divinyl tetramethyl disiloxane complex in a vinyl chainstopped fluid having the formula $M^{vi}D_{25}M^{vi}$, (1% Pt), and 0.62 g of methyl hydrogen stopped dimethylpolysiloxane crosslinker.

Each of the formulations were drawn on 42# super calendered kraft (SCK) paper and the minimum cure time at 190° F. was determined by noting at what cure time in a Blue M forced air oven was required to attain a solid coating that did not migrate to Scotch 610® tape. Data are presented in Table 5

TABLE 5

| Minimum Cure Times at 190° F. | |
| --- | --- |
| Example | Minimum Cure Time seconds |
| 16 | 15 |
| 17 | 20 |
| 18 | 12 |
| 19 | 13 |

Polymers D and E, the polymers of the instant invention had the shortest cure times.

EXAMPLE 20

Preparation of Polymer F 636 g of the low viscosity MTD fluid previously described was reacted with 1,360 g of a vinyl chain stopped fluid having the formula $M^{vi}D_{25}M^{vi}$, 1,526 g of octamethylcyclotetrasiloxane and 2.0 g potassium silanolate as previously described. After neutralization, Polymer F was obtained as a 228 centipoise fluid having a vinyl content of 1.2 weight percent.

EXAMPLE 21

Polymer F Emulsion 395.8 g of Polymer F was mixed with 26.8 g of a trimethylsilyl stopped methyl hydrogen dimethylpolysiloxane crosslinker having a hydride content of 1.05 weight percent, 17.9 g of a low viscosity di-silanol stopped fluid, 1.2 g of 3, 5-dimethyl-l-hexyn-3-ol, o.6 Triton X-100®, and 1.2 g Igepal CA-520. To this mixture was added 125 g de-ionized water and 180 g of a 10 weight percent solution of polyvinyl alcohol (PVA, 88% hydrolyzed). The resulting mixture was thoroughly mixed for one hour and then passed through a colloid mill into a mixture of 226.3 g de-ionized water, 22.5 g propylene glycol, 2.3 g formalin and 0.2 g of AF9020®,manufactured by GE Silicones, antifoam agent. The resulting mixture was thoroughly mixed for an hour and the homogenized at 8,000 psi (three passes) to yield a 1,050 centipoise emulsion having a particle size of 0.50 microns and a span of 1.64.

EXAMPLE 22

Multi-Functional Polymer Emulsion 390.2 g of the same multi-functional polymer as in examples 5 and 8 was mixed with 32.4 g of hydride crosslinker as previously described and then emulsified in an identical procedure as described in example 21. The resulting emulsion had a viscosity of 1,050 centipoise with a particle size of 0.50 micron and a span of 1.64.

EXAMPLE 23

Vinyl Chain Stopped Polymer Emulsion 404.9 g of the same vinyl chainstopped polymer as in example 4 was mixed with 17.7 g of hydride crosslinker as previously described and emulsified in an identical procedure to that described in example 21. The resulting emulsion had a viscosity of 1,700 centipoise with a particle size of 0.48 micron and a span of 1.73.

28.2 g of each of the emulsions prepared in examples 21 through 23 were added to 71.8 g de-ionized water followed by 0.9 of SM3010 platinum emulsion, producing a coating bath. The coating baths were coated onto Kammerer AV100 glassine paper using a #5 Meyer bar and then cured in a Blue M oven. Minimum cure times were determined for these baths at 240° F., as shown in Table 6.

TABLE 6

Minimum Cure Times at 240° F.

| Example | Minimum Cure Time seconds |
|---|---|
| 21 | 12 |
| 22 | 15 |
| 23 | 12 |

Samples for release testing were prepared by coating them again with a #5 bar and curing at 300° F. for 30 seconds. The coatweights of these samples were measured to be 1.02 lbs/ream for examples 21 and 22 and 0.93 lbs/ream for example 23. Laminates were then prepared using Flexcryl 1625® emulsion acrylic adhesive and a 50 lb./ream smudge proof facestock. Release force, measured as g/2 in was then measured at a multiplicity of delamination speeds after an aging period of one day. The results are summarized in Table 7.

TABLE 7

Release Force Data (g/2 in.) versus Delamination Speed after One Day Aging

| Delamination Speed Example no. | 0.04 m/s | 1.0 m/s | 2.5 m/s | 5.0 m/s |
|---|---|---|---|---|
| 21 | 46.1 | 90.0 | 105.0 | 115.1 |
| 22 | 67.9 | 103.1 | 111.9 | 140.8 |
| 23 | 27.1 | 110.3 | 147.9 | 189.5 |

These examples demonstrate that polymers of the invention provide a fast cure (Table 6) and simultaneously provide a lower release force as a function of delamination speed by comparison to other polymers in use.

EXAMPLE 24

Polymer F Solventless Formulation 800 g of polymer F was mixed with 12.0 g of a solution of platinum divinyl tetramethyldisiloxane complex (1% Pt) in a 225 centipoise vinyl chainstopped fluid, then further mixed with 3.2 g of diallyl maleate followed by 37.6 g of trimethylsilyl stopped methyl hydrogen dimethylpolysiloxane crosslinker having a hydride content of 1.05 weight percent as SiH.

EXAMPLE 25

Vinyl Chainstopped Polymer Control Formulation 800 g of a 225 centipoise vinyl chainstopped fluid was mixed with 12.0 g of a solution of platinum divinyl tetramethyl disiloxane complex (1% Pt) in a 225 cps vinyl chainstopped fluid, then further mixed 3.2 g diallyl maleate followed by 19.2 of a trimethylsilyl stopped methyl hydrogen dimethylpolysiloxane crosslinker having a hydride content of 1.05 weight percent as SiH.

Formulations 24 and 25 were coated onto Kammerer AV100® glassine paper using a Dixon Pilot Coater using differential offset gravure to yield a coat weight of 0.73 lb./ream. The coated paper stock was cured in 350° F., passing the paper through at a rate of 100 m fpm. Laminates were then prepared using Ashland 1085® solvent acrylic adhesive and 50 lb./ream smudgeproof facestock. Release force, measured as g/2 in was then measured at a multiplicity of delamination speeds after an aging period of fifteen days. The results are summarized in Table 8.

TABLE 8

Release Force Data (g/2 in.) versus Delamination Speed after Fifteen Days Aging

| Delamination Speed Example no. | 0.04 m/s | 1.0 m/s | 2.5 m/s | 5.0 m/s |
|---|---|---|---|---|
| 24 | 22.5 | 40.3 | 45.5 | 53.8 |
| 25 | 32.8 | 56.4 | 68.5 | 78.5 |

The following examples strengthen the comparisons already presented.

EXAMPLE 26

Polymer F Formulation 800 g of Polymer F was mixed with 1.0 g of a platinum divinyl tetramethyldisiloxane complex (12% Pt), then further mixed with 3.2 g diallyl maleate followed by 47.2 g of a trimethyl stopped methylhydrogen dimethylpolysiloxane crosslinker having a hydride content of 1.05 weight percent as SiH.

EXAMPLE 27

Single Branched T Resin Formulation 800 g of $T(D_{50}M^{vi})_3$, a singly branched vinyl stopped alkenyl resin after the teachings of U.S. Pat. No. 4,386,135, was mixed with 1.0 g of a platinum divinyl tetramethyl disiloxane complex (12% Pt), then further mixed with 3.2 g diallyl maleate followed by 36.0 g of a trimethylsilyl stopped methylhydrogen dimethylpolysiloxane crosslinker having a hydride content of 1.05 weight percent as SiH.

EXAMPLE 28

Linear Alkenyl Stopped Formulation 240 g of a dimethylpolysiloxane terminated by vinyldimethylsilyl groups at both chain ends having a viscosity 225 centipoise was mixed with 560 g of dimethyl methylvinyl polysiloxane polymer having vinyldimethyl 25 groups at the chain ends, a viscosity of 450 centipoise, and a vinyl content of 1.6 weight percent, as taught in U.S. Pat. No. 4,057,596. This mixture of vinyl stopped polymers was then mixed with 1.0 g of a platinum divinyl tetramethyl disiloxane complex (12% Pt), and further mixed with 3.2 g diallyl maleate followed by 64.8 g of a trimethylsilyl stopped methylhydrogen dimethylpolysiloxane crosslinker having a hydride content of 1.05 weight percent as SiH and 16.0 g of a polydimethylsiloxane terminated by hydrogendimethylsilyl groups at both ends having a viscosity of approximately 20 centipoise.

EXAMPLE 29

Combination Formulation: Alkenyl Chainstopped T Resin 240 g of a dimethylpolysiloxane terminated by vinyldimethylsilyl groups and having a viscosity of 225 centipoise was mixed with 560 g of $T(D_{50}M^{vi})_3$, and 1.0 g of a platinum divinyl tetramethyldisiloxane complex (12% Pt). This was then further mixed with 3.2 g diallyl maleate followed by 32.8 g of a trimethylsilyl stopped methylhydrogen dimethylpolysiloxane crosslinker having a hydride content of 1.05 weight percent as SiH and 16.0 g of a polydimethylsiloxane terminated by hydrogendimethylsilyl groups at both ends having a viscosity of approximately 20 centipoise.

Determination of Minimum Cure Times at 200° F.

Each of then formulations of examples 26 through 29 were drawn down on Kammerer AV100® glassine paper and the minimum cure time at 200° F. was determined by noting at what time in a Blue M® forced air oven a solid coating of the test material did not migrate to Scotch 610® tape. Results are summarized in Table 9

TABLE 9

| Minimum Cure Times at 200° F. | |
|---|---|
| Example No. | Min. Cure Time (sec.) |
| 26 | 11 |
| 27 | 17 |
| 28 | 17 |
| 29 | 13 |

Formulations 26 through 29 were coated onto Kammerer AV100® glassine paper using a Dixon Pilot Coater using differential offset gravure to yield a coat weight varying between of 0.7 and 0.8 lbs/ream. The coated paper stock was cured in a 350° F. oven, passing the paper through at a rate of 100 m fpm. Laminates were then prepared using Flexcryl 1625® emulsion acrylic adhesive and 50 lb./ream smudgeproof facestock. Release force, measured as g/2 in was then measured at a multiplicity of delamination speeds after an aging period of three days. The results are summarized in Table 10.

TABLE 10

| Release Force Data (g/2 in.) versus Delamination Speed after Three Days Aging | | | | | |
|---|---|---|---|---|---|
| Delamination Speed Example no. | 0.04 m/s | 0.5 m/s | 1.0 m/s | 2.5 m/s | 5.0 m/s |
| 26 | 20.9 | 46.3 | 56.1 | 60.1 | 65.4 |
| 29 | 22.3 | 64.4 | 74.5 | 103.1 | 98.2 |
| 28 | 33.2 | 53.7 | 63.1 | 72.1 | 75.5 |
| 27 | 24.3 | 62.5 | 78.7 | 95.8 | 96.9 |

Example 26, exemplary of the present invention, has surprisingly provided a consistently lower release force at all delamination speeds. Further, the material of the present invention also provided a faster cure time. By comparison to the prior art examples 27 and 28, the combination, example 29, exhibited a lower release force at low delamination speeds but showed higher release forces at the two highest delamination speeds than either example 27 or example 28. This divergence in results provides no guidance based on a consideration of the chemical structures involved in the resins of examples 27 and 28 in how to modify the structures of the resins of examples 27 and 28 to achieve low release at all delamination speeds and a faster cure time. Thus the compositions of the present invention provide for a flatter release profile relative to the compositions of the prior art, i.e. changes in release force as a function of increasing delamination speed.

Having described the invention that which is claimed is:

1. A substantially branched curable alkenyl silicone having the formula $$M^{vi}{}_a T_b D_c M_d$$

where $M^{vi} = R_{3-p} R^1{}_p SiO_{1/2}$, where R is selected from the group consisting of one to forty carbon monovalent hydrocarbon radicals and trifluoropropyl and $R^1$ is a two to forty carbon atom terminal olefinic monovalent hydrocarbon radical, where p ranges from 1 to 3;

$T = R^2 SiO_{3/2}$ where $R^2$ is selected from the group consisting of R and $R^1$;

$D = R^3 R^4 SiO_{2/2}$ where $R^3$ and $R^4$ are each independently selected from the group consisting of R and $R^1$; and $M = R_3 SiO_{1/2}$ where each R is as previously defined and is independently selected; wherein a and b have values ranging from 2 to 5, c is an integer ranging from about 50 to about 1,000 and d has a value ranging from 0 to about 0.5.

2. The composition of claim 1 additionally comprising a substantially linear hydrogen siloxane selected from the group of compounds:

$$MD_e D'_f M,$$

$$MD'_f M,$$

$$MD_e D'_f M',$$

$$M'D_e D'_f M', \text{ and}$$

$$M'D_e M'$$

where $M = R'_3 SiO_{1/2}$, $M' = H_g R'_{3-g} SiO_{1/2}$, and $D = R'R'SiO_{2/2}$, and $D' = R'HSiO_{2/2}$ wherein each R' in M, M', D, and D' is independently selected from the group consisting of one to forty carbon monovalent hydrocarbon radicals and trifluoropropyl wherein the subscript e is zero or positive and the subscript f is zero or positive whereby the sum of e and f ranges from about 10 to about 100 subject to the limitation that the sum of f and g is two or greater.

3. The composition of claim 2 wherein the substantially linear hydrogen siloxane is selected from the group consisting of $$MD_e D'_f M, \text{ and}$$

$$MD'_f M.$$

4. The composition of claim 3 where R is methyl, trifluoropropyl or phenyl and $R^1$ is selected from the group consisting of two to ten carbon atom alkenyl groups.

5. The composition of claim 4 wherein the subscripts a, b, and d satisfy the relationship $a+d \geq b$.

6. An aqueous emulsion comprising the composition of claim 5.

7. A curable paper release composition comprising:
(A) a substantially branched alkenyl silicone having the formula:

$$M^{vi}_a T_b D_c M_d$$

where
$M^{vi}=R_{3-p}R^1_p SiO_{1/2}$, where R is selected from the group consisting of one to forty carbon monovalent hydrocarbon radicals and trifluoropropyl and $R^1$ is a two to forty carbon atom olefinic monovalent hydrocarbon radical, where p ranges from 1 to 3;
$T=R^2 SiO_{3/2}$ where $R^2$ is selected from the group consisting of R and $R^1$;
$D=R^3 R^4 SiO_{2/2}$ where $R^3$ and $R^4$ are each independently selected from the group consisting of R and $R^1$; and
$M=R_3 SiO_{1/2}$ where each R is as previously defined and is independently selected; wherein a and b have values ranging from 2 to 5, c is an integer ranging from about 50 to about 1,000 and d has a value ranging from 0 to about 0.5;
(B) a substantially linear hydrogen siloxane selected from the group of compounds:

$$MD_e D'_f M,$$

$$MD'_f M,$$

$$MD_e D'_f M',$$

$$M'D_e D'_f M', \text{ and}$$

$$M'D_e M'$$

where
$M=R_3 SiO_{1/2}$,
$M'=H_g R'_{3-g} SiO_{1/2}$, and
$D=RRSiO_{2/2}$, and
$D'=RHSiO_{2/2}$ wherein each R in M, M', D, and D' is independently selected from the group consisting of one to forty carbon monovalent hydrocarbon radicals and trifluoropropyl wherein the subscript e is zero or positive and the subscript f is zero or positive whereby the sum of e and f ranges from about 10 to about 100 subject to the limitation that the sum of f and g is two or greater;
(C) a hydrosilylation catalyst; and
(D) a cure inhibitor.
8. The composition of claim 7 wherein the substantially linear hydrogen siloxane is selected from the group consisting of $$MD_e D'_f M, \text{ and}$$

$$MD'_f M.$$

9. The composition of claim 8 where R is methyl, trifluoropropyl or phenyl and $R^1$ is selected from the group consisting of two to ten carbon atom alkenyl groups.
10. The composition of claim 9 wherein the subscripts a, b, and d satisfy the relationship $a+d \geq b$.
11. An aqueous emulsion comprising the composition of claim 10.
12. A curable paper release composition comprising:
(A) a substantially branched alkenyl silicone having the formula:

$$M^{vi}_a T_b D_c M_d$$

where
$M^{vi}=R_{3-p}R^1_p SiO_{1/2}$, where R is selected from the group consisting of one to forty carbon monovalent hydrocarbon radicals and trifluoropropyl and $R^1$ is a two to forty carbon atom olefinic monovalent hydrocarbon radical, where p ranges from 1 to 3;
$T=R^2 SiO_{3/2}$ where $R^2$ is selected from the group consisting of R and $R^1$;
$D=R^3 R^4 SiO_{2/2}$ where $R^3$ and $R^4$ are each independently selected from the group consisting of R and $R^1$; and
$M=R_3 SiO_{1/2}$ where each R is as previously defined and is independently selected; wherein a and b have values ranging from 2 to 5, c is an integer ranging from about 50 to about 1,000 and d has a value ranging from 0 to about 0.5;
(B) a substantially linear hydrogen siloxane selected from the group of compounds:

$$MD_e D'_f M,$$

$$MD'_f M,$$

$$MD_e D'_f M',$$

$$M'D_e D'_f M', \text{ and}$$

$$M'D_e M'$$

where
M is as previously defined and
$M'=H_g R'_{3-g} SiO_{1/2}$, and
$D=RRSiO_{2/2}$ where each R is independently selected and
$D'=RHSiO_{2/2}$
where R is as previously defined, the subscript e is zero or positive and the subscript f is zero or positive wherein the sum of e and f ranges from about 10 to about 100 subject to the limitation that the sum of f and g is two or greater;
(C) a hydrosilylation catalyst; and
(D) a cure inhibitor;
whereby delamination force is reduced.
13. The composition of claim 12 wherein the subscripts a, b, and d satisfy the relationship $a+d \geq b$; wherein the substantially linear hydrogen siloxane is selected from the group consisting of $$MD_e D'_f M, \text{ and}$$

$$MD'_f M$$

wherein R is methyl, trifluoropropyl or phenyl; wherein $R^1$ is selected from the group consisting of two to ten carbon atom alkenyl groups.
14. An aqueous emulsion comprising the composition of claim 13.
15. A curable paper release composition consisting essentially of:
(A) a substantially branched alkenyl silicone having the formula:

$$M^{vi}_a T_b D_c M_d$$

where
$M^{vi}=R_{3-p}R^1_p SiO_{1/2}$, where R is selected from the group consisting of one to forty carbon monovalent hydrocarbon radicals and trifluoropropyl and $R^1$ is a two to forty carbon atom olefinic monovalent hydrocarbon radical, where p ranges from 1 to 3;

$T = R^2SiO_{3/2}$ where $R^2$ is selected from the group consisting of R and $R^1$;

$D = R^3R^4SiO_{2/2}$ where $R^3$ and $R^4$ are each independently selected from the group consisting of R and $R^1$; and $M = R_3SiO_{1/2}$ where each R is as previously defined and is independently selected; wherein a and b have values ranging from 2 to 5, c is an integer ranging from about 50 to about 1,000 and d has a value ranging from 0 to about 0.5;

(B) a substantially linear hydrogen siloxane selected from the group of compounds:

$MD_eD'_fM$, $MD'_fM$, $MD_eD'_fM'$, $M'D_eD'_fM'$, and $M'D_eM'$ where
M is as previously defined and
$M' = H_gR_{3-g}SiO_{1/2}$
$D = RRSiO_{2/2}$ where each R is independently selected and
$D' = RHSiO_{2/2}$ where R is as previously defined, the subscript e is zero or positive and the subscript f is zero or positive wherein the sum of e and f ranges from about 10 to about 100 subject to the limitation that the sum of f and g is two or greater;

(C) a hydrosilylation catalyst; and (D) a cure inhibitor;

whereby delamination force is reduced.

16. The composition of claim 15 wherein the substantially linear hydrogen siloxane is selected from the group consisting of $MD_eD'_fM$, and $MD'_fM$.

17. The composition of claim 16 where R is methyl, trifluoropropyl or phenyl and $R^1$ is selected from the group consisting of two to ten carbon atom alkenyl groups.

18. The composition of claim 16 wherein the subscripts a, b, and d satisfy the relationship $a+d \geq b$.

19. An aqueous emulsion comprising the composition of claim 18.

* * * * *